Oct. 9, 1934.   N. W. STORER   1,976,525
LOCOMOTIVE CONTROL SYSTEM
Filed March 19, 1932   3 Sheets-Sheet 1

WITNESSES:

INVENTOR
Norman W. Storer.
ATTORNEY

Patented Oct. 9, 1934

1,976,525

UNITED STATES PATENT OFFICE 1,976,525

LOCOMOTIVE CONTROL SYSTEM

Norman W. Storer, Pittsburgh, Pa., assignor to Westinghouse Electric & Manufacturing Company, a corporation of Pennsylvania Application March 19, 1932, Serial No. 599,940

7 Claims. (Cl. 172—179)

My invention relates, generally, to motor control systems and, more particularly, to systems for controlling the operation of the propelling motors of an electric locomotive.

The tractive effort that can be developed by an electric motor and locomotive driving axle is limited by the adhesion between the driving wheels and the rails of the track. The adhesion depends upon the weight on the wheels, the condition of the track as to surface and the speed of the locomotive. The weight on an individual axle may vary because of weight transfer resulting from various causes and if the axles have individual drives, that is, a driving motor on each axle, one pair of wheels may slip if the adhesion suddenly drops a small amount when the motors are developing normal tractive effort. If the wheel starts to slip, the adhesion decreases rapidly and the tractive effort is correspondingly decreased.

It has been learned that a higher maximum tractive effort can be maintained by mechanically coupling two or more axles together with side rods than where the axles are driven individually. However, coupling axles together mechanically is an undesirable complication and electrical means have long been sought for accomplishing similar results in a simpler manner.

Therefore, an object of my invention, generally stated, is to provide for obtaining the maximum tractive effort from a motor-driven vehicle in a simple and efficient manner.

A more specific object of my invention, is to provide an electrical means for preventing or limiting the slipping of the wheels on an electric vehicle in which the axles of the vehicle are driven individually by electric motors.

Other objects of the invention will become apparent as the description proceeds.

According to my invention, the slipping of the driving wheels on a locomotive is limited by crossing a portion of the field windings of motors connected in parallel-circuit relation in such a manner that they will react on each other, permitting the tractive effort of one motor to be decreased with a definitely limited increase in speed, while the tractive effort of the other motor will be increased by a similar amount without a change in speed.

For a fuller understanding of the nature and scope of the invention, reference may be had to the following detailed description, taken in conjunction with the accompanying drawings, in which:

Fig. 4 is a chart showing the sequence of operation of the motor control switches.

Figure 3:
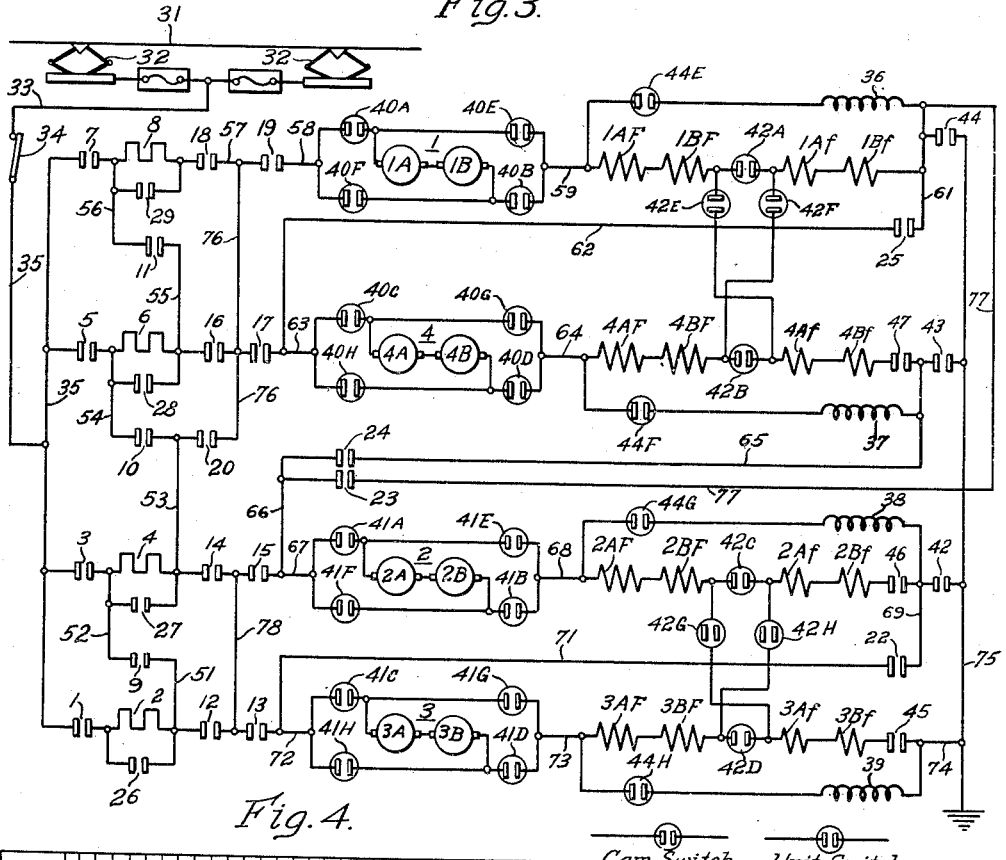
Fig. 3 is a schematic diagram of the control system illustrated in Figs. 1 and 2.

Referring to the drawings, particularly Fig. 3, the diagram shows the motor connections for a locomotive having four driving axles, each equipped with a twin motor, the armature and field windings of which are permanently connected in series-circuit relation. The axles of the locomotive (not shown) may be numbered 1, 2, 3 and 4 and the corresponding motors on each axle 1A and 1B, 2A and 2B, 3A and 3B, and 4A and 4B. The field windings of the motors are divided into two sections, designated as 1AF and 1Af, 1BF and 1Bf; 2AF and 2Af, 2BF and 2Bf; 3AF and 3Af, 3BF and 3Bf; and 4AF and 4Af, and 4BF and 4Bf, respectively. Provision is made for crossing the field windings 1Af and 1Bf with 4Af and 4Bf, also 2Af and 2Bf with 3Af and 3Bf. The axles will thus be controlled in pairs and the slipping of one will affect only one other axle, as will be explained more fully hereinafter.

Power for operating the motors on the locomotive may be obtained from an overhead conductor 31, which may be energized from a power station (not shown). The current is transmitted from the overhead conductor 31, through pantograph collectors 32, a power conductor 33, and a disconnecting switch 34 to a power conductor 35.

In accordance with the usual practice in railway control systems, the motors may be connected in series-circuit relation to start the vehicle. After it has accelerated to a predetermined speed, the motors on axles 1 and 4 are connected in parallel. The motors on axles 2 and 3 are also connected in parallel. The two groups of parallel-connected motors are connected in series, thus establishing what is commonly known as a series-parallel connection. In order to still further increase the speed of the vehicle, the four sets of motors are connected across the power source in parallel-circuit relation, thereby applying maximum voltage to the motors. A plurality of electrically-operated unit switches 12 to 20 and 22 to 25, and 42 to 47, inclusive, are provided for connecting the motors in the desired circuit relation.

In order to still further control the acceleration of the motors, a plurality of resistors 2, 4, 6 and 8 may be connected in the motor circuit. With a view to simplifying the drawings and the description, only four resistors have been shown. However, it will be readily understood that as many resistors as are desired may be utilized. Four switches 26, 27, 28 and 29 are provided for shunting the resistors, 2, 4, 6 and 8 respectively. Unit switches 1, 3, 5 and 7 are provided for connecting the motors to the power conductor 35.

Manually-operated reversing switches 40A—B—C—D—E—F—G—H and 41A—B—C—D—E—F—G—H reverse the direction of current in the armature windings of the motors, thereby controlling the direction of movement of the vehicle. When the switches 40A—B—C—D and 41A—B—C—D are closed, the vehicle is propelled in the forward direction and when the switches 40E—F—G—H and 41E—F—G—H are closed, the vehicle is propelled in the reverse direction.

In accordance with a well known principle, provision is made for shunting the field windings of the respective motors through inductive shunts 36, 37, 38 and 39 in order to still further increase the speed of the motors after all the resistance has been shunted out of the motor circuits. Cam switches 44E—F—G—H are provided for establishing the field shunting circuits, thereby increasing the speed of the motors.

Figure 1:
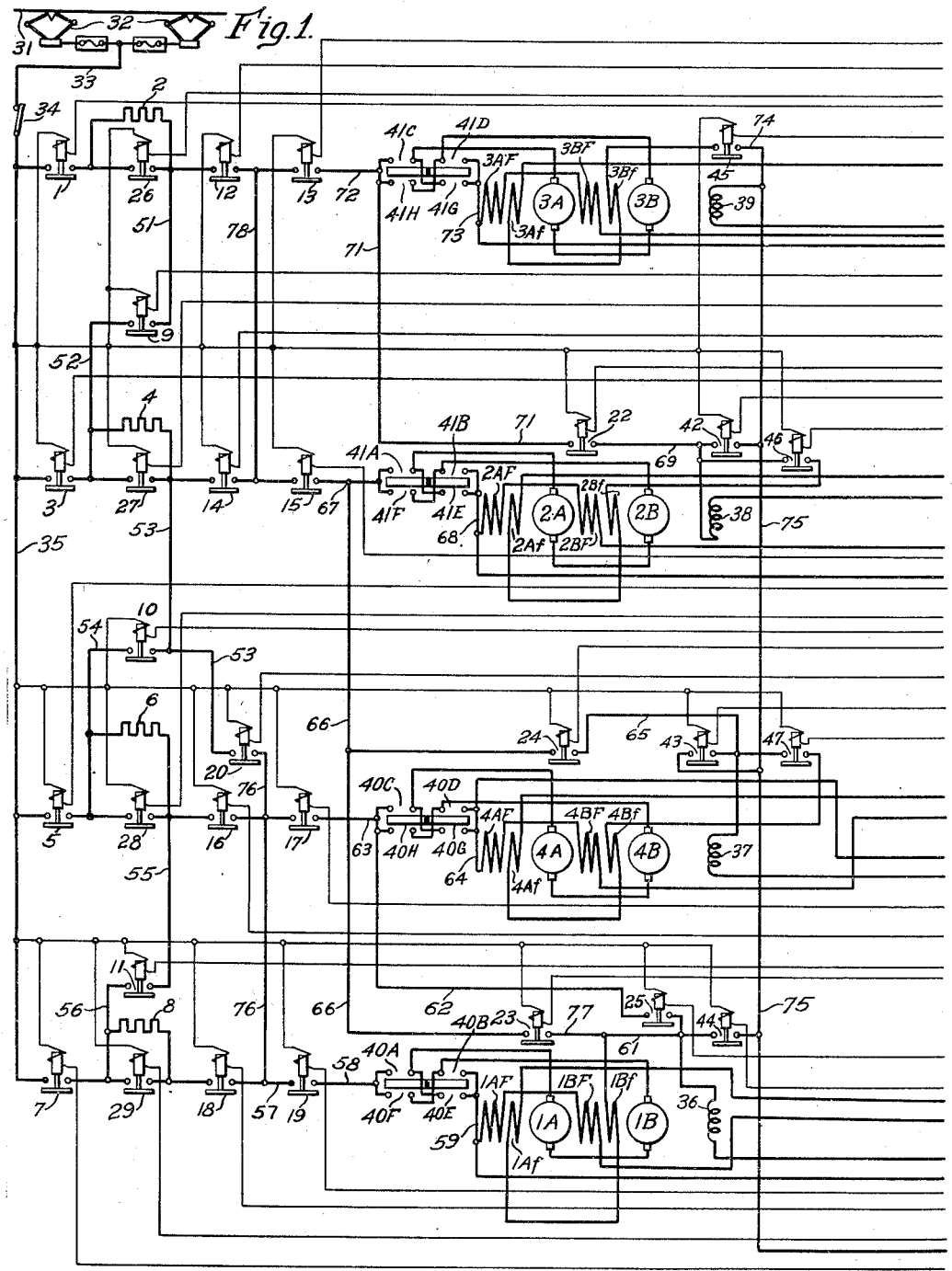
Figures 1 and 2 are a diagrammatic view of a locomotive control system embodying my invention.
Figure 2:
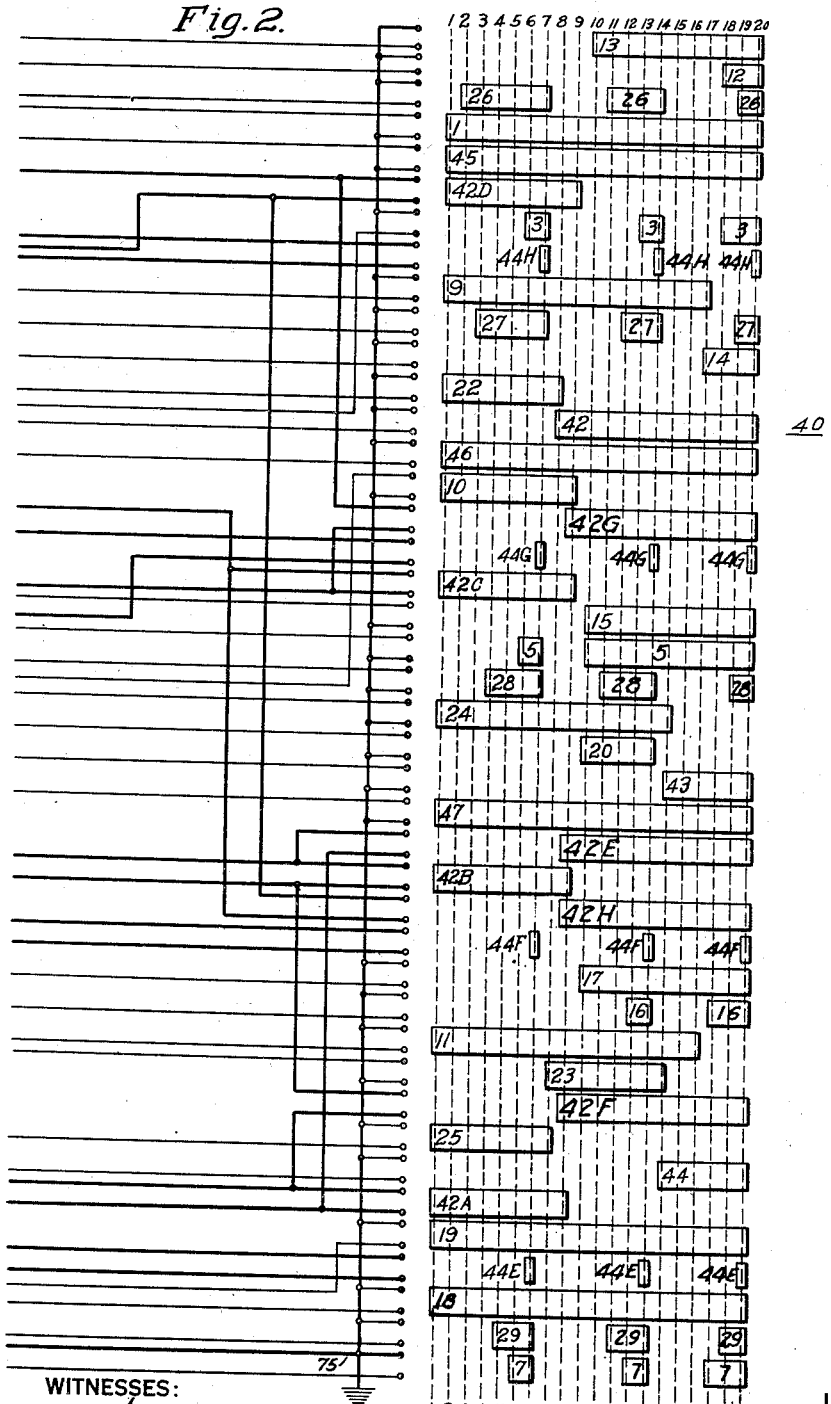

As illustrated in Fig. 2, the cams of the cam switches 44E—F—G—H, and of additional switches which will be described later, are mounted upon a drum 40, which may be operated either manually or by an air engine in a manner well known in the art. In addition to the cam switches, the drum 40 also carries a plurality of contact segments for controlling the operation of the previously mentioned electrically operated unit switches, which are designated by the same reference characters as the corresponding switches which they control in order to assist in understanding the operation of the system.

As previously stated, portions of the field windings of motors 1A and 1B are crossed with portions of the field windings of motors 4A and 4B when these motors are connected in parallel in order to prevent wheel slippage. Likewise, portions of the field windings of motors 2A and 2B are crossed with portions of the field windings of motors 3A and 3B. Cam switches 42A—B—C—D—E—F—G—H are provided for effecting the crossing of the field windings when the motors are connected in parallel-circuit relation.

Figure 5:
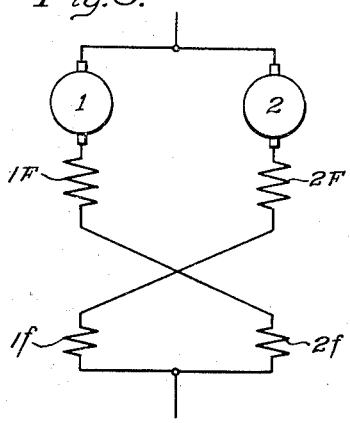
Fig. 5 is a sketch showing how a portion of the field windings of two motors, connected in parallel, may be cross-connected to prevent the slipping of the wheels on the axles driven by the respective motors.

The manner in which the scheme of crossing a portion of the field windings of two motors connected in parallel limits the slipping of the wheels on the axles driven by the motors may be more readily understood by referring to Fig. 5. The motors 1 and 2 are connected in parallel, with a portion 1f, of the field winding of motor 1 connected in series with a portion 2F, of the field winding of motor 2 and a portion 2f, of the field winding of motor 2 is connected in series with a portion 1F, of motor 1, as shown in Fig. 5.

Assuming that the wheels driven by motor number 1 start to slip, then the speed of number 1 motor increases, thereby increasing its counter-electromotive force which decreases the current flowing through its armature, a relatively small increase in speed effecting a large decrease in armature current. Since a portion, 2f, of the field of motor 2 is in series with the armature of motor 1, the decrease in current through motor 1 weakens the field of motor 2 causing its counter-electromotive force to decrease and permitting the current flowing through its armature to increase. Since a portion, 1f, of the field winding of motor 1 is in series with the armature of motor 2, the increase of current through motor 2 strengthens the field of motor 1, thereby holding down its speed and preventing or limiting the wheel slippage.

In a similar manner, the reaction of motor 1 limits the speed at which motor 2 can operate. Therefore, it will be readily understood that the reaction of the motors on each other, when electrically connected as shown in Fig. 5, effects the prevention of wheel slippage in much the same manner as mechanically coupling the axles together. It is also apparent that the electrical method herein disclosed is much simpler than the mechanical method previously utilized.

It has been found that if the wheels driven by one motor start to slip when the entire field windings of two motors are crossed, the combination is unstable, causing hunting and even reversal of the direction of rotation of one motor. However, the desired results may be achieved by crossing only a part of the field windings of the motors, as previously described. Tests on locomotive motors have shown that the most satisfactory results will be obtained by crossing from 40 to 50 percent of the field windings of the motors, thereby producing a stable combination of the motors and so dividing the load as to limit the slipping of the wheels to a minimum amount. However, I do not limit myself to these values but claim any portion of crossed fields.

Inasmuch as it is unsafe to short circuit a motor that is separately excited, provision is made for connecting each armature in series with its entire field winding when the transition from series to series-parallel connection is being made, during which time certain of the motors are short circuited. Referring to Fig. 4, it will be seen that the switches 42A—B—C—D, which connect the field windings in series, remain closed during transition from series to series-parallel. The cam switches 42E—F—G—H, which cross-connect the field windings of the motors, are closed after the first step of the transition period has passed. The switches 42A—B—C—D are opened after the switches 42E—F—G—H are closed, as shown in Fig. 4. Both sets of switches are closed during a portion of the transition period, thereby connecting portions of the field windings in parallel during this period which will not injure the motors. In the next step of the switching operation the switches 42A—B—C—D are opened and the switches 42E—F—G—H are left closed, thereby establishing the crossed-field connections previously described.

In order that the functioning of the foregoing apparatus may be better understood, the operation of the locomotive control system will now be described. Assuming that it is desired to set the locomotive in motion in a forward direction, the drum 40 may be actuated to position 1. Referring to the sequence chart shown in Fig. 4, it will be seen that when the drum 40 is in position 1, the unit switches 1, 9, 10, 11, 18, 19, 22, 25, 24, 45, 46, and 47, and also the cam switches 42A—B—C—D are closed. Accordingly the four sets of twin motors which drive the locomotive are connected in series-circuit relation and are connected to the power source in series with the resistors 2, 4, 6 and 8.

The main motor circuits may be traced from the power conductor 35 through the unit switch 1, resistor 2, conductor 51, the unit switch 9, conductor 52, resistor 4, conductor 53, unit switch 10, conductor 54, resistor 6, conductor 55, the unit switch 11, conductor 56, resistor 8, unit switch 18, conductor 57, unit switch 19, conductor 58, the reversing switch 40A, the armatures 1A and 1B which, as previously stated, are permanently connected in series relation, reversing switch 40B, conductor 59, the field windings 1AF and 1BF, the cam switch 42A, the field windings 1A*f* and 1B*f*, conductor 61, unit switch 25, conductor 62, the reversing switch 40C, the armatures 4A and 4B, reversing switch 40D, conductor 64, the field windings 4AF and 4BF, the cam switch 42B, field windings 4A*f*, and 4B*f*, the unit switch 47, conductor 65, the unit switch 24, conductor 66, the reversing switch 41A, the armatures 2A and 2B, the reversing switch 41B, conductor 68, the field windings 2AF and 2BF, the cam switch 42C, the field windings 2A*f* and 2B*f*, unit switch 46, conductor 69, unit switch 22, conductor 71, the reversing switch 41C, the armatures 3A and 3B, reversing switch 41D, conductor 73, the field windings 3AF and 3BF, the cam switch 42D, field windings 3A*f* and 3B*f*, the unit switch 45 and conductor 74 to the grounded conductor 75.

The locomotive may be accelerated in a manner well known in the art by actuating the drum 40 through positions 2 to 6, inclusive, thereby shunting the resistors 2, 4, 6 and 8 by closing the unit switches 26, 27, 28 and 29. It will be noted that when the drum 40 is actuated to position 7, the cam switches 44E—F—G—H are closed, thereby shunting the field windings of the motors through the inductive shunts 36, 37, 38 and 39, respectively, to still further increase the speed of the motors, in accordance with a well known principle.

As is the usual practice, the motors may be connected in series-parallel circuit relation in order to increase the speed of the locomotive. After passing through the transition period, the motors 1A and 1B are connected in parallel with 4A and 4B, and this group is connected in series-circuit relation with a second group composed of motors 2A and 2B which are connected in parallel with the motors 3A and 3B.

Referring again to Fig. 4, it will be seen that the unit switches 1, 5, 9, 11, 13, 15, 17, 18, 19, 20, 23, 24, 42, 45, 46, and 47, and the cam switches 42E—F—G—H are closed when the drum 40 is actuated to position 10. As previously explained, portions of the field windings of the motors which are connected in parallel are crossed in order to prevent the slipping of the wheels driven by the respective motors. The crossed-field connections are established upon the closing of the cam switches 42E—F—G and H and the opening of the cam switches 42—A—B—C and D. The resistors which control the motor currents are also divided into two groups at this time, one group consisting of resistors 2 and 4 connected in series and the other group consisting of resistors 6 and 8 connected in series.

Accordingly, power is supplied to the motors through switch 5, resistor 6, conductor 55, switch 11, conductor 56, resistor 8, switch 18, and conductor 57 to a conductor 76 which joins the switches 17 and 19, now closed, to connect the motors 1 and 4 in parallel. Power is also supplied through switch 1, resistor 2, conductor 51, switch 9, conductor 52, resistor 4, conductor 53 and switch 20 to the conductor 76 from which current may flow through the switches 17 and 19 to the motors 1A and 1B, and 4A and 4B, now connected in parallel, and through conductors 77 and 65 and the switches 23 and 24 to the conductor 66. Since the switches 13 and 15 are now closed, the motors 2 and 3 are connected in parallel by a conductor 78 which joins the switches 13 and 15. The current may, therefore, divide and flow through the motors 2A and 2B and the switch 42 to the grounded conductor 75, and also through the motors 3A and 3B and switch 45 to the grounded conductor 75.

The manner in which portions of the field windings of motors 1A and 1B are crossed with portions of the field windings of motors 4A and 4B when the motors are connected in parallel, and also portions of the field windings of motors 2A and 2B are crossed with portions of the field windings of motors 3A and 3B may be seen by referring to Fig. 3. It will be observed that when switches 42E and 42F are closed, the cam switches 42A and 42B being open, the field windings 1AF and 1BF are connected in series with the windings 4A*f* and 4B*f* by means of the cam switch 42E. Likewise, the winding 4AF and 4BF are connected in series with 1A*f* and 1B*f* by means of the cam switch 42F, thereby cross-connecting the portions 1A*f* and 1B*f*, and 4A*f* and 4B*f* of the field windings of the motors 1 and 4.

In a similar manner, the switches 42G and 42H serve to cross-connect the field windings 2A*f* and 2B*f* with 3A*f* and 3B*f* of the motors 2 and 3 which are also in parallel relation.

The speed of the locomotive may be further increased by connecting all four sets of motors directly to the power source in parallel-circuit relation, as is well known in the art. However, the crossed relation of the field windings of the motors 1 and 4 and also 2 and 3 may be maintained at all times when the respective motors are in parallel-circuit relation, thereby preventing slipping of the wheels in the manner previously explained.

It is believed to be unnecessary to describe in detail the various steps of accelerating the motors, as this is well known in the railway control art. It will be understood that accelerating the motors by shunting the resistors which control the motor currents and by changing the motor connections from series-parallel to parallel-circuit relation will not effect the results attained by cross-connecting the field windings of the motors as herein described.

It will be understood that the control system illustrated may be so modified that a motor on each driving axle will be electrically interlocked with motors on two other axles when the motors are operating in the series-parallel or parallel combinations. When twin motors, as shown, are utilized, the motor 1A may be connected in parallel with motor 2A and these two in series with motors 3A and 4A which are connected in parallel. The motor 1B may be connected in parallel with motor 3B and these two in series with motors 2B and 4B which are connected in parallel. In this case portions of the field windings of motors 1A and 2A may be crossed, and also portions of the field windings of motors 3A and 4A.

In a similar manner, portions of the field windings of motors 1B and 3B may be crossed and also motors 2B and 4B. It will thus be seen that the motors on axle number 1 will be interlocked with motors on axles 2 and 3. The motors on axle number 2 will be interlocked with motors on axles 1 and 4, those on axle number 3 with axles 1 and 4 and those on axle number 4 with axles 2 and 3. In this manner equalization of the tractive effort on the axles is assured and slipping of the wheels is prevented or eliminated to a negligible value.

While I have illustrated the motor connections for a locomotive equipped with twin motors, it will be understood that the control system herein described may be readily applied on a locomotive in which each axle is driven by a single motor. Therefore, my invention is not limited to locomotives in which the axles are driven by twin motors.

From the foregoing description it is evident that I have provided a simple and efficient means for preventing the slipping of the wheels on a vehicle in which its axles are driven individually by electric motors connected in parallel-circuit relation.

Since many modifications may be made in the apparatus and arrangement of parts without departing from the spirit of my invention, I do not wish to be limited other than by the scope of the appended claims.

I claim as my invention:

1. In a motor-driven vehicle provided with a plurality of driving axles having wheels mounted thereon, in combination, a propelling motor for rotating each driving axle, said motors having armature windings and series field windings, the series field winding of each motor being divided into two portions, one portion having a smaller number of ampere turns than the other, a source of power for operating the motors, switching means for connecting the motors to the power source in parallel-circuit relation, and switching means for cross-connecting the smaller portions of the field windings of the motors to limit the slipping of the wheels driven by the motors.

2. In a motor-driven vehicle provided with at least two driving axles having wheels mounted thereon, in combination, a propelling motor for rotating each driving axle, said motors having armature windings and series field windings, the series field winding of each motor being divided into two portions, one portion having a smaller number of ampere turns than the other, a source of power for operating the motors, switching means for connecting at least two of the motors to the power source in parallel-circuit relation, and switching means for cross-connecting the smaller portion of the field winding of one of said motors with a corresponding portion of the field winding of the other of said motors to limit the slipping of the wheels driven by the motors.

3. In a motor-driven vehicle provided with a plurality of driving axles having wheels mounted thereon, in combination, a propelling motor for rotating each driving axle, said motors having armature windings and series field windings, the series field winding of each motor being divided into two portions, one portion having a smaller number of ampere turns than the other, a source of power for operating the motors, switching means for connecting the motors to the power source in series-parallel circuit relation, and switching means for cross-connecting the smaller portions of the field windings of said motors which are connected in parallel-circuit relation to limit the slipping of the wheels driven by said motors.

4. In a motor-driven vehicle provided with a plurality of driving axles having wheels mounted thereon, in combination, a propelling motor for rotating each driving axle, said motors having armature windings and series field windings, the series field winding of each motor being divided into two portions, one portion having a smaller number of ampere turns than the other, a source of power for operating the motors, switching means for connecting the motors to the power source in series-parallel circuit relation, the motors being connected in two or more groups with two motors connected in parallel in each group, and switching means for cross-connecting the smaller portion of the field winding of one motor of each group with a corresponding portion of the field winding of the other motor in the same group to limit the slipping of the wheels driven by the respective motors.

5. In a motor-driven vehicle provided with a plurality of driving axles having wheels mounted thereon, in combination, a propelling motor for rotating each driving axle, said motors having armature windings and series field windings, the series field winding of each motor being divided into two parts one part having a smaller number of ampere turns than the other, a source of power for operating the motors, switching means for first connecting the motors to the power source in series-circuit relation, additional switching means for connecting the motors in parallel-circuit relation to accelerate the motors, means for cross-connecting only those portions of the field windings having the smaller number of ampere turns when the motors are in parallel, and means for preventing the field windings from being crossed while the motors are connected in series-circuit relation.

6. In a motor-driven vehicle provided with a plurality of driving axles having wheels mounted thereon, in combination, a propelling motor for rotating each driving axle, said motors having armature windings and series field windings, the series field winding of each motor being divided into two parts one part having a smaller number of ampere turns than the other, a source of power for operating the motors, switching means for connecting the motors to the power source in series-circuit relation, additional switching means for connecting the motors in parallel-circuit relation, means for operating said switching means in sequential relation, means for cross-connecting only those portions of the field windings having the smaller number of ampere turns when the motors are connected in parallel, and means for preventing the field windings from being crossed while the motor connections are being changed from series to parallel-circuit relation.

7. In a system of control, the combination with a plurality of locomotive axles having wheels mounted thereon, of a propelling motor for driving each axle, said motors having armature windings and series field windings, the series field winding of each motor being divided into two parts, the ampere turns in one part being less than fifty per cent of the total number of ampere turns in the motor field, a source of power for operating the motors, switching means for connecting the motors to the power source in parallel-circuit relation, and switching means for cross-connecting corresponding parts of the field windings of the motors having the smaller number of ampere turns to limit the slipping of the wheels driven by the motors and to produce stable operation of the motors.

NORMAN W. STORER.